(12) United States Patent
Kim et al.

(10) Patent No.: US 9,027,335 B2
(45) Date of Patent: May 12, 2015

(54) APPARATUS AND CATALYST CAN FOR EXHAUST GAS OF VEHICLE

(71) Applicant: Hyundai Motor Company, Seoul (KR)

(72) Inventors: Woo Tae Kim, Anyang-si (KR); Chun Woo Lee, Suwon-si (KR); In Gee Suh, Yongin-si (KR); Joon Won Lim, Seoul (KR); Il Joong Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 13/905,572

(22) Filed: May 30, 2013

(65) Prior Publication Data

US 2014/0182275 A1    Jul. 3, 2014

(30) Foreign Application Priority Data

Dec. 28, 2012  (KR) .......................... 10-2012-0156722

(51) Int. Cl.
*F01N 3/028* (2006.01)
*F01N 13/00* (2010.01)
*F01N 3/28* (2006.01)

(52) U.S. Cl.
CPC ................ *F01N 13/017* (2014.06); *F01N 3/28* (2013.01); *F01N 3/2892* (2013.01)

(58) Field of Classification Search
CPC ..... F01N 3/2892; F01N 13/017; F01N 13/08; F01N 13/10; F01N 3/28
USPC ............................................. 60/296, 323, 324
See application file for complete search history.

(56) References Cited

U.S. PATENT DOCUMENTS

| 8,011,232 | B2 | 9/2011 | Protin et al. | |
|---|---|---|---|---|
| 2006/0053780 | A1* | 3/2006 | Kikuchi et al. | 60/299 |
| 2006/0266026 | A1* | 11/2006 | Kato et al. | 60/324 |

FOREIGN PATENT DOCUMENTS

| CA | 2 519 160 A1 | 10/2004 |
|---|---|---|
| DE | 10331691 B4 * | 4/2006 |
| JP | 10-212929 A | 8/1998 |
| JP | 2005-214100 A | 8/2005 |
| KR | 2003-0046624 A | 6/2003 |
| WO | WO 2004/090319 A2 | 10/2004 |

OTHER PUBLICATIONS

Machine translation of DE 10331691 B4, accessed Sep. 6, 2014.*

* cited by examiner

*Primary Examiner* — Audrey K Bradley
*Assistant Examiner* — Jonathan Matthias
(74) *Attorney, Agent, or Firm* — Morgan, Lewis & Bockius LLP

(57) ABSTRACT

A catalyst can of exhaust gas can include a catalyst embedded substantially in the center of an inner space of the catalyst can, and an inflow space and a discharge space partitioned in an upper part and a lower part of the catalyst can, respectively. The catalyst can also includes an inflow-side partition vertically cutting and dividing the inflow space into a plurality of partial inflow spaces, and an inlet formed for each partial inflow space.

10 Claims, 3 Drawing Sheets

APPARATUS AND CATALYST CAN FOR EXHAUST GAS OF VEHICLE

CROSS-REFERENCE TO RELATED APPLICATION

The present application claims priority of Korean Patent Application Number 10-2012-0156722 filed Dec. 28, 2012, the entire contents of which application are incorporated herein for all purposes by this reference.

BACKGROUND OF INVENTION

1. Field of Invention

The present invention relates to an apparatus and a catalyst can for exhaust gas of a vehicle that can reduce interference of discharged exhaust gas, prevent loss of low and medium speed performance, and reduce manufacturing cost.

2. Description of Related Art

In general, exhaust gas output through a combustion process in a cylinder of an engine is discharged to the outside through an exhaust manifold, a catalyst, a muffler, and the like. An engine of the vehicle is generally constituted by a plurality of cylinders and the exhaust gas output through the combustion process is discharged through the exhaust manifold.

As such, as exhaust gas output from different cylinders is discharged through the exhaust manifold, the exhaust gases may interfere with each other. In this case, interference occurs by inertia of the discharged exhaust gases, and as a result, discharge performance may deteriorate. Low and medium speed performance may be significantly lost or deteriorated due to the phenomenon.

On the other hand, as an exhaust gas regulation is enforced, the exhaust gas is purified by installing a catalyst. In the case of the catalyst, an upstream catalyst converter (UCC) is mounted on a downstream of an engine exhaust pipe to purify the exhaust gas, but as the exhaust gas regulation is enforced, a warming-up catalytic converter (WCC) is installed to reduce hazardous substances of the exhaust gas.

As an exhaust system which prevents the aforementioned interference of the discharged exhaust gases and adopts the WCC, a 4-2-1 exhaust system is used. FIG. 1 is a diagram illustrating an exhaust system in prior art and in a 4-2-1 exhaust system according to the prior art, a WCC can 10 is divided into two cans to be used. In detail, Exhaust pipe 1 and Exhaust pipe 4 are connected to each other and Exhaust pipe 2 and Exhaust pipe 3 are connected to each other, and as a result, each of two exhaust pipes are connected to the WCC can 10. Low and medium speed performance can be improved as compared with the existing 4-1 exhaust system, but the WCC can 10 is constituted by two cans, and as a result, a problem occurs in terms of prime cost and packaging.

Therefore, an exhaust apparatus is required, which prevents exhaust performance from deteriorating by minimizing interference of the discharged exhaust gas, improves the low and medium speed performance, and is advantageous in prime cost saving and packaging.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a catalyst can of exhaust gas of a vehicle and an exhaust apparatus which prevent exhaust performance from deteriorating, improve the low and medium speed performance, and are advantageous in prime cost saving and packaging.

In various aspects of the present invention, a catalyst of exhaust gas includes a catalyst embedded substantially in the center of an inner space of the catalyst can, an inflow space and a discharge space partitioned in an upper part and a lower part of the catalyst can, respectively, an inflow-side partition vertically cutting and dividing the inflow space into a plurality of partial inflow spaces; and an inlet formed for each partial inflow space.

A plurality of partitions vertically cross each other to form a plurality of through-holes in the partial inflow spaces of the inflow space. The plurality of through-holes may be formed in a shape corresponding to a cross-sectional shape of the catalyst.

A top partition may be provided on a top portion of the catalyst and a plurality of ventilation holes may be formed on the top partition.

An upper fixation groove corresponding to a bottom portion of the inflow-side partition is formed on the top partition and the bottom portion of the inflow-side partition is inserted into the upper fixation groove. A clearance having a predetermined size may be formed between the bottom portion of the inflow-side partition and the upper fixation groove. An elastic mat may be provided between the bottom portion of the inflow-side partition and the upper fixation groove.

The inflow-side partition may be formed in a wave shape which is curved horizontally.

The catalyst can of exhaust gas may further include a discharge-side partition vertically cutting and dividing the discharge space into a plurality of partial discharge spaces.

The catalyst can of exhaust gas may further include an outlet allowing the flows of exhaust gases partitioned into the partial discharge spaces, and the outlet is formed in a lower part of the discharge space.

A lower fixation groove corresponding to the top portion of the discharge-side partition may be formed on the bottom portion of the catalyst and the bottom partition with the plurality of ventilation holes may be provided on the bottom portion of the catalyst. The top portion of the discharge-side partition may be inserted into the lower fixation groove.

In other aspects of the present invention, an exhaust apparatus of a vehicle may include an exhaust manifold in which two or more exhaust pipes among a plurality of exhaust pipes of an engine are joined to form a plurality of joined exhaust pipes. The exhaust apparatus also includes a catalyst can that comprises a catalyst incorporated substantially in a center of an inner space of the catalyst can, an inflow space and a discharge space formed in an upper part and a lower part of the catalyst can, respectively, and an inflow-side partition vertically cutting and dividing the inflow space into a plurality of partial inflow spaces. A respective jointed exhaust pipe or each respective jointed exhaust pipe in the plurality of joined exhaust pipes may be connected to a corresponding partial inflow space in the plurality of partial inflow spaces to supply exhaust gas.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
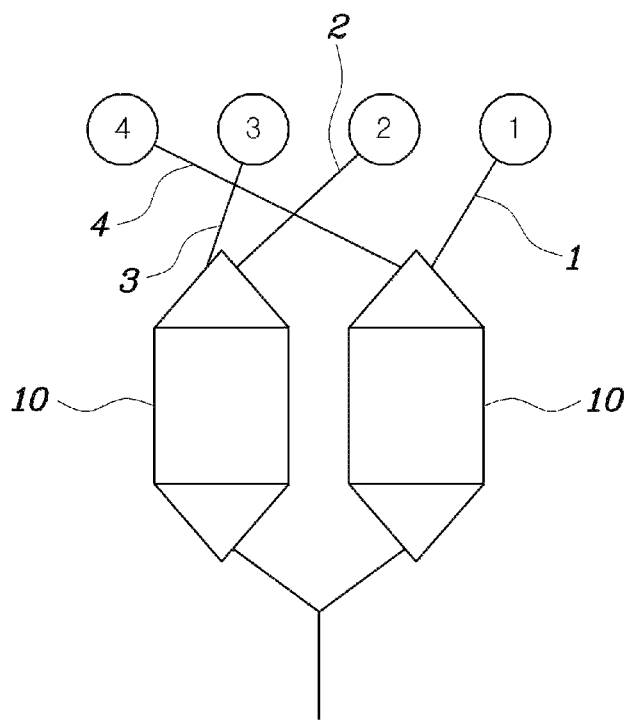
FIG. 1 is a diagram illustrating an exhaust system in prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
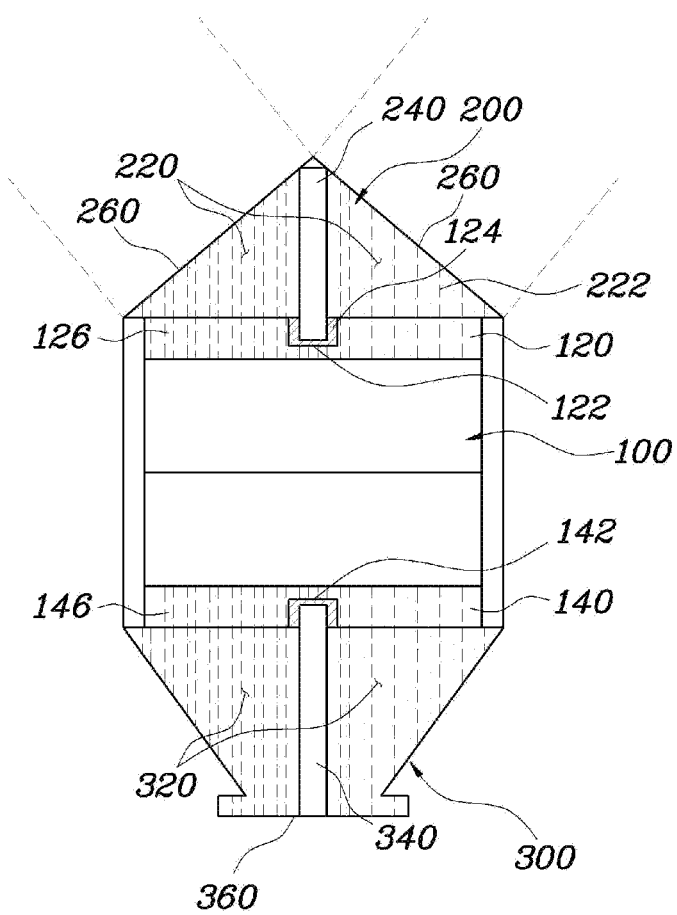
FIG. 2 is a diagram illustrating an exemplary catalyst can of exhaust gas of a vehicle according to the present invention.

FIG. 2 is a diagram illustrating a catalyst can of exhaust gas of a vehicle according to various embodiments of the present invention. The catalyst can of exhaust gas may include a catalyst 100 embedded in the center of an inner space; an inflow space 200 and a discharge space 300 which are partitioned in an upper part and a lower part of the catalyst 100, respectively; a inflow-side partition 240 vertically cutting and dividing the inflow space 200 into a plurality of partial inflow spaces 220; and an exhaust gas inlet 260 formed for each partial inflow space 220.

In general, the catalyst 100 for reducing exhaust gas is provided in a vehicle and the catalyst may be applied to various engines such as a four-cylindered engine, a six-cylindered engine, and the like. A serial four-cylindered engine will be primarily described as an illustrative example of various embodiments of the present invention. In accordance with various embodiments of the present invention, an exhaust apparatus of can prevent interference of exhaust gases, which is a largest advantage of a 4-2-1 exhaust system, maintain improvement of low and medium speed performance, and achieve prime cost saving and compact packaging.

As illustrated in FIG. 2, the various embodiments of the present invention relates to a catalyst can including an inflow space 200, the catalyst 100, and a discharge space 300. In various embodiments of the present invention, a plurality of catalyst cans are not installed in a plurality of exhaust pipes of the engine, but the plurality of exhaust pipes are connected to one catalyst can. Moreover, an inflow-side partition 240 is installed in the internal inflow space to allow the exhaust gas to smoothly flow without interference, so as to prevent interference of the flow of the exhaust gases, which may occur by sharing one catalyst can.

The catalyst 100 is provided substantially at the center of an inner space of the catalyst can, and an inflow space 200 and a discharge space 300 which are partitioned are formed in an upper part and a lower part of the catalyst can, respectively. Herein, a plurality of exhaust pipes are connected to the inflow space 200 and as the exhaust gas output from the engine flows in the catalyst can, interference between the exhaust gases may occur.

An inflow-side partition 240 vertically cutting and dividing the inflow space 200 into a plurality of partial inflow spaces 220 is installed in the inflow space 200 to prevent interference of exhaust gases which flows in from each exhaust pipe.

As such, an inlet 260 of exhaust gas is formed in the inflow space 200 divided into the partial inflow spaces 220 by the inflow-side partition 240 so that the plurality of exhaust pipes are connected to the inflow space 200 to allow exhaust gas that flows through the plurality of exhaust pipes to flow into the catalyst can.

Herein, the number of the inlets 260 may be the same as the number of the plurality of exhaust pipes and the number of the partial inflow spaces 220 partitioned by the inflow-side partition 240 may also be the same as that. In some embodiments, these numbers may be different.

The discharge space 300 as a space for discharging purified exhaust gas after the exhaust gas passes through the inflow space 200 and the catalyst 100 prevents interference of exhaust gases discharged when the exhaust gas passing through the catalyst 100 joins in one exhaust pipe.

That is, various aspects of the present invention prevent exhaust performance from deteriorating by interference of the discharged exhaust gas and improves low and medium speed performance, and is advantageous in prime cost saving and packaging by simultaneously connecting the plurality of exhaust pipes to one catalyst can.

In various embodiments, a plurality of through-holes 222 formed by a plurality of partitions which cross each other vertically may be formed in the partial inflow spaces 220 of the inflow space 200. Moreover, the through-hole 222 may be formed in a shape corresponding to a cross-sectional shape of the catalyst 100.

As such, when the plurality of through-holes 222 is formed in the partial inflow spaces 220 of the inflow space 200, the exhaust gas which flows into the inflow space 200 uniformly flows to prevent the flow of the exhaust gas from being interrupted.

Moreover, the through-hole 222 may be formed in a shape corresponding to a cross-sectional shape of the catalyst 100. In various embodiments, the catalyst 100 has a honey comb shape and a catalyst 100 in which a cross section has the honeycomb shape exists and the cross-sectional shape is diversified in accordance with performance and function. That is, the shape of the through-hole 222 of the partial inflow space 220 is the same or substantially the same as that of the cross section of the catalyst 100 and the through-hole 222 and the cross section of the catalyst 100 correspond to each other to allow the exhaust gas to more smoothly flow to the catalyst side in the inflow space.

As a result, the exhaust gas which flows into the catalyst can through the exhaust pipe uniformly flows to the catalyst 100 through the through-hole 222 of the inflow space 200 and the through-hole 222 has the shape corresponding to the cross-sectional shape of the catalyst 100 to allow the exhaust gas to smoothly flow into the catalyst 100, thereby reducing generation of resistance and interference by the flow of the exhaust gas.

Figure 3:
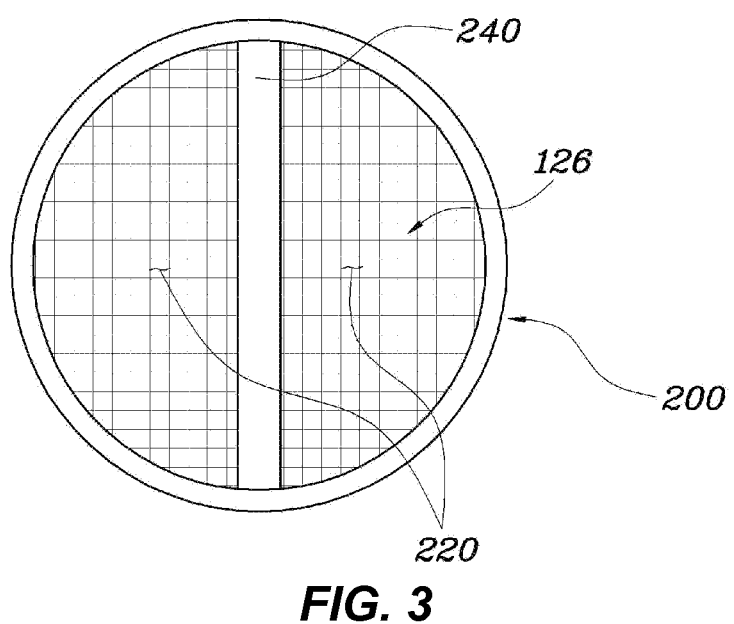
FIG. 3 is a cross-sectional view illustrating an exemplary inflow space of the exemplary catalyst can illustrated in FIG. 2 according to the present invention.

Meanwhile, as illustrated in FIG. 3, a top partition 120 is provided at a top portion of the catalyst 100 and a plurality of ventilation holes 126 may be formed on the top partition 120.

The top partition 120 is connected with the inflow-side partition 240 and partitions the inflow space 200 and the catalyst 100. The plurality of ventilation holes 126 are formed on the top partition 120 to allow the exhaust gas which flows into the inflow space 200 to flow to the catalyst 100 side. Herein, the ventilation hole 126 has the same shape or substantially the same shape as the cross-sectional shape of the catalyst 100 and the shape of the through-hole 222 of the partial inflow space 220 to allow the exhaust gas to smoothly flow.

An upper fixation groove 122 corresponding to a bottom portion of the inflow-side partition 240 may be formed on the top partition 120 and the bottom portion of the inflow-side partition 240 may be inserted into an upper fixation groove 122.

As such, the upper fixation groove 122 is formed on the top partition 120 and the bottom portion of the inflow-side partition 130 is inserted into the upper fixation groove 122 to fix the inflow-side partition 240 to the top partition 120. That is, since the inflow-side partition 240 provided in the inflow space 200 is exposed to exhaust gas which flows at high pressure, vibration is generated on the inflow-side partition 240 by the flow of the exhaust gas, and as a result, durability may deteriorate. Moreover, the reason is that when the inflow-side partition 240 swings by the high-pressure exhaust gas, resistance is generated in the exhaust gas which flows, and as a result, exhaust performance may deteriorate.

Herein, a clearance having a predetermined size may be formed between the bottom portion of the inflow-side partition 240 and the upper fixation groove 122 and an elastic mat 124 may be provided between the bottom portion of the inflow-side partition 240 and the upper fixation groove 122.

In various embodiments of the present invention, the inflow-side partition 240 may be made of a metallic material and the metallic material may be thermally expanded by the exhaust gas which is discharged at high temperature and high pressure. That is, the inflow-side partition 240 may deform the top partition 120 by thermal expansion, and as a result, durability of the top partition 120 may be damaged. Further, the width of the ventilation hole 126 formed on the top partition 120 is changed, and as a result, interference may occur in the flow of the exhaust gases. That is, a clearance having a predetermined size is provided between the bottom portion of the inflow-side partition 240 and the upper fixation groove 122 of the top partition 120 to consider the thermal expansion of the inflow-side partition 240.

The elastic mat 124 may be provided between the bottom portion of the inflow-side partition 240 and the upper fixation groove 122, and as a result, the inflow-side partition 240 is fixed between the inflow-side partition 240 and the upper fixation groove 122 by removing the clearance and when the inflow-side partition 240 is thermally expanded, the elastic mat 124 is contracted and relaxed to deal with the deformation by the thermal expansion. The elastic mat may be made of a material such as a mat installed to protect the catalyst can from shock.

Figure 4:
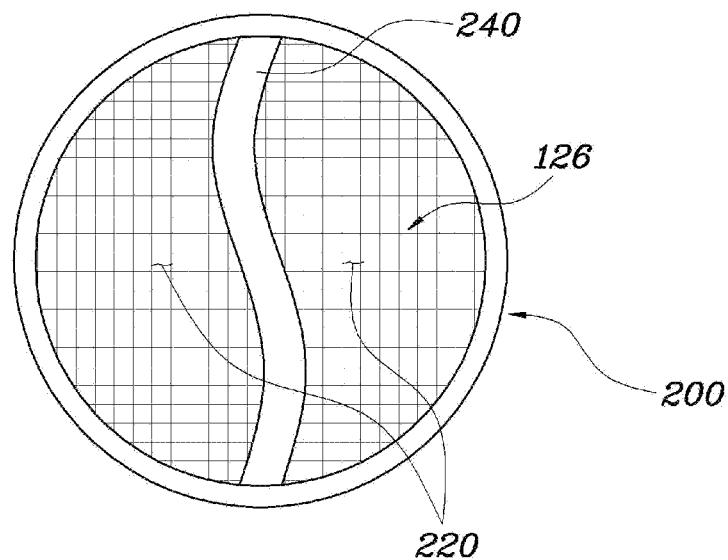
FIG. 4 is a cross-sectional view illustrating another exemplary inflow space of the exemplary catalyst can illustrated in FIG. 2 according to the present invention.

Meanwhile, as illustrated in FIG. 4, the inflow-side partition 240 may be formed in a wave shape which is curved horizontally.

As the high-temperature and high-pressure exhaust gas flows into the inflow space 200, the inflow-side partition 240 is thermally expanded by the high temperature and the high pressure to be deformed. The thermal expansion may influence durability of the catalyst can and cause a problem such as performance deterioration. Therefore, the inflow-side partition 240 is curved horizontally to form the wave shape. Therefore, the inflow-side partition 240 absorbs the deformation by the thermal expansion to secure durability performance of the catalyst can and prevent exhaust performance from deteriorating.

The wave shape changes a curvature which is curved horizontally or differently applies the wave shape to reduce the deformation by the thermal expansion of the inflow-side partition 240.

Meanwhile, the catalyst can may further include a discharge-side partition 340 which vertically cuts and divides the discharge space 300 into a plurality of partial discharge spaces 320. Further, the catalyst can may further include an outlet 360 that joins the flow of exhaust gas partitioned into the partial discharge spaces 320 below the discharge space 300.

A smooth flow of the exhaust gas that passes through the inflow space 200 and the catalyst 100 described above needs to be maintained until the exhaust gas gets out of the inside of the catalyst can. To this end, the discharge-side partition 340 is provided in the discharge space 300, and as a result, the discharge gas that passes through the catalyst 100 may smoothly flow to the outside of the catalyst can by dividing the discharge space 300 into the plurality of partial discharge spaces 320. As such, the exhaust gas which smoothly flows without interference through the partial discharge space 320 flows to one exhaust pipe through the outlet 360 that joins the flow of the partitioned exhaust gas. That is, various aspects of the present invention of the present invention may be applied to the 4-2-1 exhaust system and the low and medium speed performance may be improved through the exhaust system.

Herein, the lower fixation groove 142 corresponding to the top portion of the discharge-side partition 340 and the bottom partition 140 with the plurality of ventilation holes 146 may be provided on the bottom portion of the catalyst 100.

The bottom partition 140 is configured to surround and support the catalyst 100 together with the top partition 120 described above. The plurality of ventilation holes 146 formed on the bottom partition 140 are formed in a shape corresponding to a cross-sectional shape of the catalyst 100 to allow the exhaust gas to smoothly flow.

Further, the lower fixation groove 142 corresponding to the top portion of the discharge-side partition 340 may be formed on the bottom partition 140 and the top portion of the discharge-side partition 340 may be inserted into the lower fixation groove 142.

As such, the lower fixation groove 142 is formed on the bottom of the bottom partition 140 and the top portion of the discharge-side partition 340 is inserted into and fixed to the bottom of the bottom partition 140, and as a result, the discharge-side partition 340 is vibrated by the high-pressure exhaust gas, thereby preventing the flow of the exhaust gas from being interrupted.

A clearance having a predetermined size may be provided between the top portion of the discharge-side partition 340 and the lower fixation groove 142, and as a result, the elastic mat 124 may be provided to be filled in the clearance. As such, the elastic mat is provided between the top portion of the discharge-side partition 340 and the lower fixation groove 142, and as a result, the discharge-side partition 340 may absorb a change of the discharge-side partition 340 due to thermal expansion by the exhaust gas discharged at the high temperature and the high pressure.

The inflow-side partition 240 and the discharge-side partition 340 and the top partition 120 and the bottom partition 140 which are described above may be made of a SUS material (stainless) which is resistant to corrosion.

Figure 5:
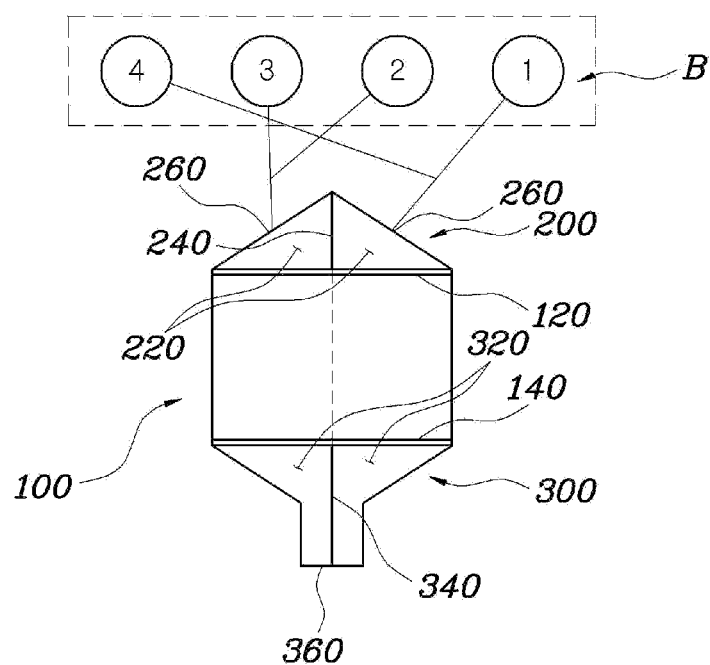
FIG. 5 is a diagram illustrating an exemplary exhaust apparatus of the present invention.

Meanwhile, FIG. 5 is a diagram illustrating an exemplary exhaust apparatus in accordance with various embodiments of the present invention. An exhaust apparatus of a vehicle includes an exhaust manifold B in which some exhaust pipes among a plurality of exhaust pipes of an engine are joined to each other to configure a plurality of joined exhaust pipes; and a catalyst can in which a catalyst 100 is incorporated in the center of an inner space, and an inflow space 200 and a discharge space 300 which are partitioned are formed in an upper part and a lower part of the catalyst can, respectively, an inflow-side partition 240 vertically cutting and dividing the inflow space 200 into a plurality of partial inflow spaces 220 is incorporated in the inflow space 200, and the plurality of joined exhaust pipes are connected for each partial inflow space 220 to supply exhaust gas.

Herein, the exhaust manifold is configured in such a manner that some exhaust pipes among the plurality of exhaust pipes are joined to form the plurality of joined exhaust pipes. In more detail, in the case of a serial four-cylindered engine, since combustion is performed in the order of 1-3-4-2 as a combustion order, the cylinders are connected to each other like 1-4 and 2-3 in order to reduce exhaust interference between the cylinders. That is, the exhaust manifold is configured so as to remove interference between exhaust gases discharged so that the flows of combusted and discharged exhaust gases cross each other.

As such, the joined exhaust pipes joined to 1-4 and 2-3 are connected to the catalyst can in various embodiments of the present invention. Herein, the catalyst can of divides the inflow space 200 into the partial inflow spaces 220 through the inflow-side partition 240 to prevent interference by partitioning the exhaust gases that flow from the respective joined exhaust pipes.

As such, in various aspects of the present invention, while the plurality of joined exhaust pipes are connected to one catalyst can, the interference between the exhaust gases is prevented to prevent the exhaust performance from deteriorating by the interference of the exhaust gas from deteriorating, improve the low and medium speed performance, and achieve prime cost saving and compact packaging.

A catalyst can of exhaust gas of a vehicle comprises a catalyst, an inflow space, and a discharge space, and an inflow-side partition is provided in the inflow space, and as a result, a plurality of joined exhaust pipes are connected to one catalyst can and discharged exhaust gas can smoothly flow without interference. Further, a discharge-side partition is provided in even the discharge space to allow the exhaust gas discharged from the catalyst can to smoothly flow.

That is, exhaust performance is prevented from deteriorating by interference of discharged exhaust gas, low and medium speed performance is improved, and it is advantageous in prime cost saving and packaging.

For convenience in explanation and accurate definition in the appended claims, the terms "upper" or "lower", "top" or "bottom", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A catalyst can for exhaust gas, comprising:
   a catalyst embedded substantially in a center of an inner space of the catalyst can;
   an inflow space and a discharge space partitioned in an upper part and a lower part of the catalyst can, respectively;
   an inflow-side partition vertically cutting and dividing the inflow space into a plurality of partial inflow spaces;
   an inlet formed for each partial inflow space in the plurality of partial inflow spaces; and
   a plurality of partitions perpendicularly crossing each other to form a plurality of through-holes in the partial inflow spaces of the inflow space,
   wherein the plurality of through-holes are formed in a shape corresponding to a cross-sectional shape of the catalyst.

2. The catalyst can of claim 1, wherein a top partition is provided on a top portion of the catalyst and a plurality of ventilation holes are formed on the top partition.

3. The catalyst can of claim 2, wherein an upper fixation groove corresponding to a bottom portion of the inflow-side partition is formed on the top partition and the bottom portion of the inflow-side partition is inserted into the upper fixation groove.

4. The catalyst can of claim 3, wherein a clearance having a predetermined size is formed between the bottom portion of the inflow-side partition and the upper fixation groove.

5. The catalyst can of claim 3, wherein an elastic mat is provided between the bottom portion of the inflow-side partition and the upper fixation groove.

6. The catalyst can of claim 1, wherein the inflow-side partition is formed in a wave shape which is curved horizontally.

7. The catalyst can of claim 1, further comprising a discharge-side partition vertically cutting and dividing the discharge space into a plurality of partial discharge spaces.

8. The catalyst can of claim 7, further comprising an outlet allowing flows of exhaust gases partitioned into the partial discharge spaces, wherein the outlet is formed in a lower part of the discharge space.

9. The catalyst can of claim 7, wherein a lower fixation groove corresponding to a top portion of the discharge-side partition is formed on a bottom portion of the catalyst and a bottom partition with a plurality of ventilation holes is provided on the bottom portion of the catalyst.

10. The catalyst can of claim 9, wherein a top portion of the discharge-side partition is inserted into the lower fixation groove.

* * * * *